Dec. 25, 1956

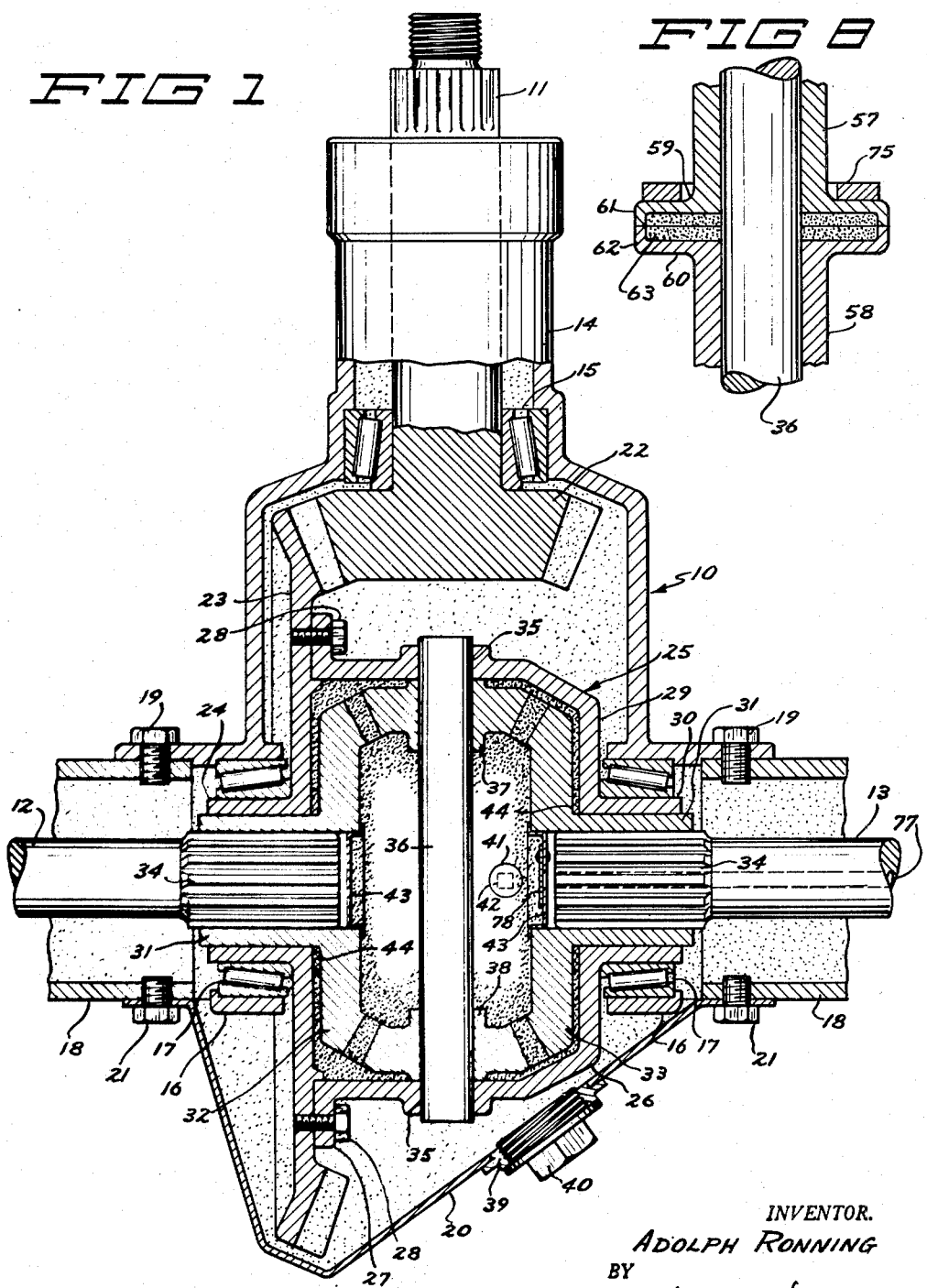

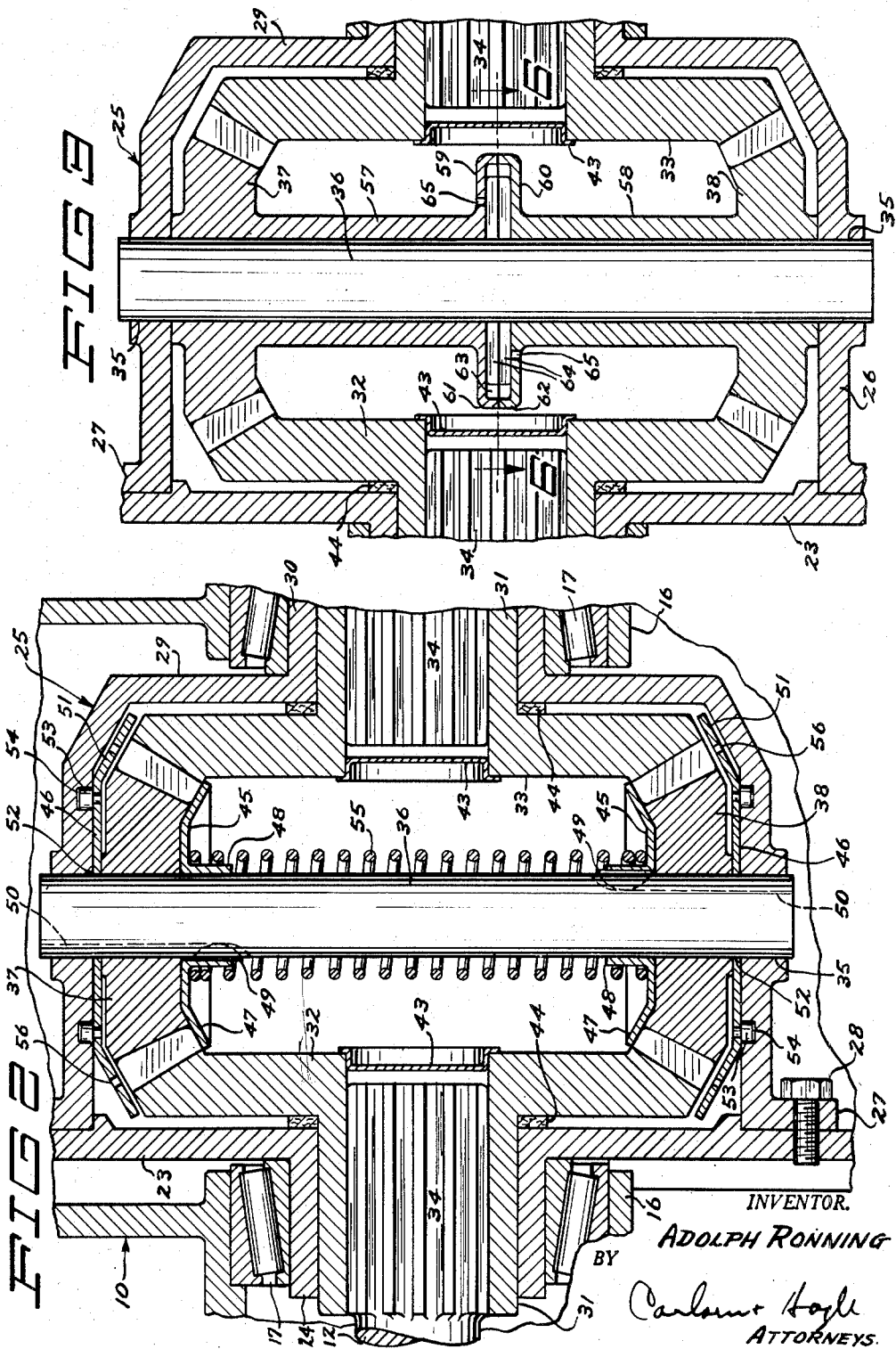

A. RONNING 2,775,141

DIFFERENTIAL

Filed Jan. 23, 1952

INVENTOR.
ADOLPH RONNING
BY
*Carleen + Hagle*
ATTORNEYS

United States Patent Office 2,775,141
Patented Dec. 25, 1956

2,775,141
DIFFERENTIAL

Adolph Ronning, Minneapolis, Minn.

Application January 23, 1952, Serial No. 267,841

13 Claims. (Cl. 74—711)

This invention relates generally to improvements in differential gearing such as now widely used for transmitting and distributing torque to the traction wheels of a vehicle, and for analogous purposes. The common differential embodies an epicyclic gear train which distributes the torque from the common driving shaft to the wheels, or driven shafts, and permits either wheel or shaft to turn differentially with respect to the other. The primary purpose, of course, is to permit one wheel to turn faster than the other when the vehicle with which the differential is associated turns a corner, and under ordinary conditions the differential operates perfectly satisfactorily. However, when one wheel loses traction then the differential operates very unsatisfactorily since the other wheel may then stand still, so that movement of the vehicle becomes difficult, if not actually an impossibility. I am aware that many mechanical expedients have been proposed to counteract this free spinning tendency of the differential by the use of locks and clutches of various kinds, but all of these, to my knowledge, have been expensive and in many cases they have interfered with or limited torque transmission to the wheels, particularly in the case of heavy-duty vehicles.

It is the primary object of my invention to provide a differential in which the epicyclic gear train is standard in arrangement and operation, so that there is no interference with torque transmission to the wheels, but to provide means and a method for dampening, braking or retarding differential action in the gearing to a degree such that free spinning of one wheel with respect to the other will be prevented, so that effective traction will be possible under all conditions. In accordance with my invention such means and method for dampening the differential action employs friction as the dampening medium instead of a mechanical lock, so that the action is smooth under all conditions, and particularly the invention contemplates the utilization of the adhesive and cohesive properties of a fluid in order to retard the differential motion of the parts.

Another object of my invention is to provide a differential having an outer housing and a separate inner receptacle therein and in which receptacle the differentially acting gears are arranged in immersion in a fluid of high viscosity, so that the fluid itself and alone will operate to dampen the differential motion of the gearing.

Another object is to provide a similar differential construction in which the meshing teeth of the differential gears are so enclosed that the fluid in the inner receptacle will be acted upon with what I term a pumping action of the meshing gear teeth, in order to augment the dampening effect of the uuid upon differential movements of the gears, and further in accordance with this object of my invention I provide such enclosure for the gear teeth in the form of plates which frictionally engage the gears, and utilize the resulting mechanical friction further to dampen the differential movements.

Another object of my invention is to provide cooperating fluid clutch elements upon opposed differentially moving gears and to utilize the reaction of these clutch elements upon the fluid to dampen and brake the differential operation.

Another object of my invention is to provide differential braking means embodying a fluid having in suspension metallic particles of a nature such that they may be magnetized to control the viscosity of the fluid, and further the use of one or more permanent magnets for magnetizing these particles so that the fluid will very effectively dampen the differential movements of the parts.

These and other detailed and specific objects will be disclosed in the course of the following specification, reference being had to the accompanying drawings, in which—

Fig. 1 is a sectional view of a differential according to my invention, showing the same as embodying a separate inner receptacle for the differential gear train and, by stippling, showing the use of a heavy fluid or fluid of high viscosity within such receptacle for braking or dampening purposes.

Fig. 2 is a sectional view of this inside receptacle or housing and adjacent parts of the differential and showing means in the form of plates for enclosing the meshing teeth of the gears to increase the pumping action of the gear teeth upon the fluid and also for obtaining the benefits of mechanical friction in braking the different action.

Fig. 3 is a view similar to Fig. 2 but showing opposed differential gears as provided with vaned hubs making up a fluid clutch for braking purposes.

Fig. 8 is a sectional view of a structure similar to that in Fig. 3, with the gears provided with hubs defining a chamber for fluid with metallic particles therein, and showing a permanent magnet for magnetizing these particles.

Figure 4:
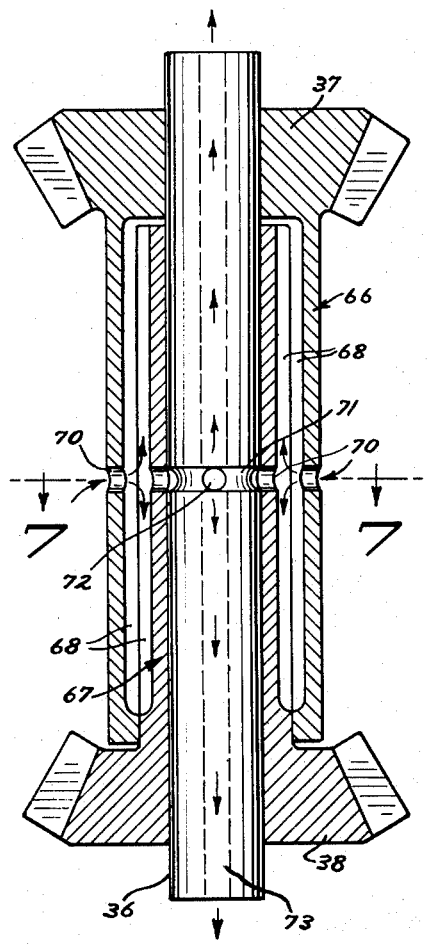
Fig. 4 is a sectional view of opposed gears and the supporting pin and with the gears provided with tubular hubs telescoped and vaned so that they also operate as a fluid clutch or brake.

Referring now more particularly and by reference characters to the drawing, and specifically to the embodiment of my invention as disclosed in Fig. 1, the differential is seen to comprise a main housing or casting 10 of a conventional construction and assembly, and here shown as accommodating a torque input or drive shaft 11 which drives oppositely extending driven shafts or axles 12 and 13 through the differential or epicyclic gear train enclosed within the housing. The housing 10 includes, therefore, a forwardly extending neck portion 14 accommodating anti-friction bearings for the shaft 11, one of which bearings appears at 15. The housing further includes opposed coaxial bearing rings 16 containing anti-friction bearings 17 into which the inner ends of the axles 12—13 extend, and in which these axles are carried as will be later described. The axles are contained within tubular axle housings 18 attached at 19 to the housing 10, and the enclosure is completed by a lighter housing section or cover 20 also attached to the housing 18, as seen at 21. It will, of course, be understood that the specific housing construction is immaterial insofar as the real essence of my invention is concerned and the construction here shown is for example only.

Within the housing 10 the input shaft 11 is provided with a bevel drive pinion 22 and the same meshes with a bevel drive gear or ring gear 23 disposed within one side of the housing and provided with an outwardly extending tubular hub 24 journaled in the adjacent bearing 17. Attached to the ring gear 23, and in cooperation therewith providing an enclosed differential gear cage, is a smaller housing or casting, designated generally at 25, having a cylindrical outer wall 26 flanged around its edges 27 for attachment by means of cap screws 28 to the ring gear. At the opposite side the housing has a circular end 29 from which there outwardly projects a tubular hub 30, analogous to the aforesaid hub 24 and journaled through the bearing 17 at the adjacent side of the structure. These tubular hubs 24—30 then rotatably accommodate smaller tubular hubs 31 of bevel sun gears 32—33, which are disposed in facing relation within the housing 25. The hubs 31 are internally splined to receive the splined inner ends 34 of the axles 12—13, so that the bevel gears 32—33 will drive the axles. The cylindrical wall 26 of the housing 25 is provided with diametrically opposed openings 35 to accommodate a diametrically extending pin or shaft 36 whereon are journaled differential or planet gears 38—38 meshing with the gears 32—33.

It will be evident that the structure as thus far described constitutes, insofar as the gearing is concerned, a conventional differential and that the rotation of the ring gear 23 by its drive pinion 22 will cause the rotating housing 25 and attached planet gears 37—38 to transmit torque through the gears 32—33 to the oppositely extending axles 12—13. At the same time either axle 12 or 13 may turn faster than the other, as is necessary, for example, when the vehicle turns the corner, such differential rotation causing one of the gears 32—33 to rotate with respect to the other with a resulting opposite rotational movement of the planet gears 37—38. As previously discussed herein it is the purpose of my invention to retard or dampen this differential rotation, so that one axle cannot spin relative to the other to the point where the associated traction wheel will lose effective driving traction and contact with the road surface.

As is customary the housing 10 is, of course, provided with a supply of lubricating oil and for this purpose the cover 20 is provided with a filler opening 39 and a plug 40 through which the lubricant may be inserted or removed. In accordance with my invention, however, the inner housing or cage 25 constitutes an enclosed and separate inner receptacle for fluid and to introduce such fluid into this housing its cylindrical wall 26 is provided with an opening 41 and plug 42 so located that when the housing is properly turned this plug and opening will be presented immediately within the opening 39, as will be readily understood. It will be noted that the opening 39 is much larger than the opening 41 in the inner housing so that a tool may be inserted for removing the plug 42 without difficulty. In order further to close this separate inner fluid receptacle or chamber the gears 32—33 are provided with oil seal plugs 43 at the inner ends of their hubs 31 so that fluid cannot escape out through the splined inner ends of the axles 12—13. Furthermore, oil seals 44 are provided between the gears 32—33 and the adjacent inner surfaces of the ring gear 23 and housing, around the hubs 31. Into this separate inner fluid receptacle I then introduce a fluid of a higher order of viscosity than the lubricating fluid within the outer housing 10, and preferably such as a very heavy oil, so that its properties of adhesion and cohesion will resist the relative rotation of the gears 32 and 33 and 37 and 38 which accompanies the differential rotation of the axles 12—13. I contemplate the selection of a fluid of such nature and characteristics that it will permit comparatively slow and minor differential movements, as necessary to accommodate the turning motion of the vehicle, but which will prohibit the free spinning prevalent in present day uncontrolled differentials. In Fig. 1 I have indicated the use of this heavy fluid by the comparatively heavier stippling within the housing 25 and it will also there be noted that the rotation of the housing will cause the fluid to move out by centrifugal force into and about the meshing teeth between the gears, so that these teeth will be forced to have a pumping action upon the fluid when there is pronounced differential movement. Thus the effectiveness of the fluid in braking or retarding the differential motion will be enhanced by this centrifuging and pumping action, and it is my conviction, therefore, that the differential motion will be so effectively braked that traction may be obtained under the worst conditions. While I realize that the use of a heavy oil in thus damping the differential will be influenced somewhat by ambient temperatures, and that during severe winter weather the oil may congeal to a point such that any differential movement will be difficult, it may be observed that such conditions are almost invariably attended by the worst roadway surface conditions, so that very limited and very heavily braked differential motion is actually an advantage.

My invention thus also involves the method of frictionally braking or damping a differential against unwanted freedom of differential action by surrounding the differentially moving gears with fluid of a viscosity such that it will retard the relative opposite movements which accompanies the differentiation, as will be understood. It will be understood that even a very heavy fluid will not in any way interfere with torque transmission to the axles or wheels under normal conditions since there is ordinarily no relative movement of the gears under these conditions.

I may find it desirable, in order to increase a pumping effect of the differential gears upon the dampening or braking fluid, to employ the structure shown in Fig. 2, wherein the housing and gear elements are all exactly the same as those shown in Fig. 1. They are accordingly referred to by the same reference characters throughout. In this case, however, I enclose the meshing teeth of the gears by inner and outer circular enclosure members, plate or disks shown at 45 and 46. There is, of course, a pair of such plates for each planetary gear 37—38 and the inner plates 45, which fit closely within the inner surfaces of the gears, have their outer circumferential edge portions 47 angled or beveled inwardly to accommodate themselves to the shape of the teeth and also have tubular hub portions 48 slidably mounted upon the pin 36. These plates 45 are, however, non-rotatably mounted with respect to the gears and for this purpose I provide the hubs 48 with keys 49 axially slidably fitting keyways 50 in the pin. The outer plates 46 are larger in diameter as necessary in order to cover the meshing teeth and they likewise have their circumferential edges 51 angled inwardly in the manner previously described. At their centers the plates 46 have openings 52 to pass the pin 36 and these plates are non-rotatably anchored with respect to the gears in any suitable manner, either by also keying them to the pin 36 or, as here shown, by providing them with studs 53 fitting into recesses 54 in the inside of housing 25. To complete this construction I then provide an expansion coil spring 55 which is placed around the pin 36 and braced between the inner plates 45 to bias them outwardly or apart so that they will closely fit and engage the gears 37 and 38.

With the housing 25 now supplied with braking or retarding fluid the centrifuging of the fluid as the housing rotates will cause it to annularly collect around the inside of the housing in intimate relation with the gears and the plates 45—46 will so enclose the meshing portions of the teeth of the gears that the fluid will be relatively confined by the plates and the gears will have a substantially increased pumping action upon the fluid. I may find it desirable to provide a series of small relief openings 56 about the outer portions of the outer plates 46 in alignment with the meshing teeth, so that the oil will circulate outward through the teeth and so that they will be continuously filled with oil as will be understood. Where the teeth are thus enclosed it may also be possible to use fluid of a lower viscosity and, furthermore, it will be observed that the outward spring bias of the plates 45 will cause them to frictionally engage the gears 37—38 and since these parts are relatively non-rotatable there will thus be a further frictional braking or dampening effect to substantially augment the over-all fluid braking against unwanted freedom of differential motions.

Figure 6:
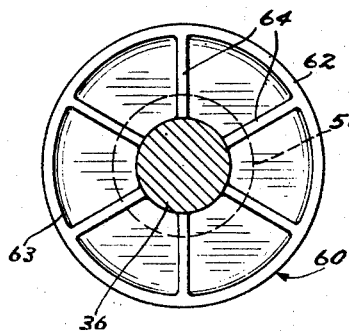
Fig. 6 is a section along the line 6—6 in Fig. 3 to show a part of the vanes in the fluid clutch or brake.

In Figs. 3 and 6 I show a further modification and logical amplification of the differential retarder of Fig. 2, and here again the housing and gearing is identical with corresponding parts designated by similar reference characters. In this case, however, the planet gears 37—38 are further provided with inwardly extending tubular hubs 57 and 58, respectively, journaled on the pin 36 and at their adjacent ends provided with diametrical enlargements 59 and 60. Such enlargements are formed by outwardly projecting flanges which terminate in annular marginal rims 61 and 62, the facing edges of which run in contact so that there is formed a separate annular compartment or chamber 63 between the facing ends of the hubs. Each hub assembly 57, 58 is then provided with slightly spaced radial vanes 64 within this chamber 63, as formed in the typical kinetic fluid clutch and fluid enters the chamber 63 and flows inwardly and outwardly through small openings 65 in the opposed enlargements 59—60. The relative or opposite rotation then of these hubs 57—58 which accompanies differential motion of the axles will cause the vanes 64 to react upon the fluid in the chamber 63 and it will, of course, be obvious that this fluid clutch action will very effectively retard the independent motion of the parts. The openings 65 are believed to be desirable.

Figure 7:
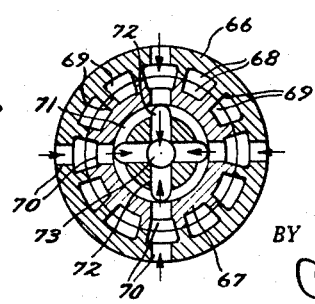
Fig. 7 is a section along the line 7—7 in Fig. 4 for the same purpose.

In Figs. 4 and 7 I show another fluid clutch as formed between the gears 37—38 which are, of course, carried as previously described upon the pinn 36. Only this portion of the entire structure is shown since all other parts remain as described, and the relationship will be obvious. Here again the gears are provided with inwardly extending tubular hubs, designated generally at 66 and 67, but in this case the hubs are telescoped, one within the other, and extend substantially the entire distance between the gears. The hubs thus are elongated cylinders and the adjacent, relatively rotatable surfaces of the hubs are provided with a plurality of longitudinally extending, shallow chambers 68 separated from each other by radial vanes or fins 69, as best seen in Fig. 7. Preferably at the center of the telescoped assembly I then provide the hubs with a plurality of radial openings, indicated throughout at 70, which communicate with a peripheral groove 71 formed in the pin 36 and which openings also, of course, communicate with the interior of the housing 25 in which the assembly is carried. The pin 36 then has a series of radial openings 72 communicating with the groove 71 and these openings communicate finally with an axially extending bore 73 opening out through the opposite ends of the pin.

In this assembly there will also be a fluid clutch action between the planet gears 37 and 38 and fluid will flow from the interior of the housing 25 through the openings 70 in order to fill the chambers 68, into which chambers the fluid will travel by the centrifugal action as the assembly rotates. At the same time fluid will pass through the openings 72 into the bore 73 by centrifugal action so that there will be a continual circulation of fluid. Thus the differential rotation of the hubs 66—67, caused by the differential action of the axles 12—12, will be retarded by the reaction of the fluid and the vanes 69, and due to the length as well as the number of these vanes there will result a very substantial dampening or braking action as is, of course, to be desired. Fluid moving out through the bore 73 will, of course, be expelled from the inner housing or cage 25 and in this case communication will be necessary between the interior of the housings 10 and 25 in order that the fluid may continuously circulate. However, due to the substantial areas of the vane 69 previously referred to, it is believed that ordinary lubricating oil will sufficiently retard or dampen the differential motion so that this is of no consequence.

Figure 5:
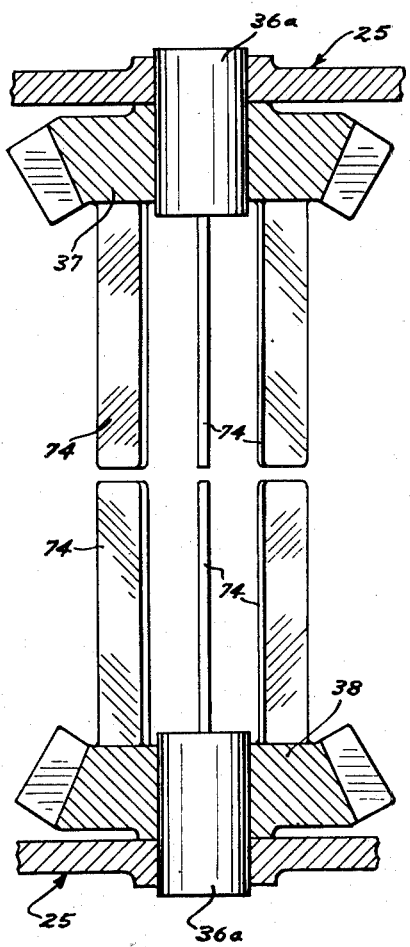
Fig. 5 is a view similar to Fig. 4 but showing the gears as provided with elongated vanes or paddles for operation in fluid contained in the inner housing in order to brake the differential action.

In Fig. 5 I have shown the planet gears 37—38 as mounted upon stub pins 36a, carried by the housing 25, and I here provide the gears with a plurality of radial, inwardly extending vanes or paddles 74. It will be apparent that these vanes, where the housing 25 is filled or substantially filled with fluid, will cause the fluid to greatly retard and dampen relative motion of the gears 37—38 with what may be described as a stirring action in the fluid.

Fig. 8 discloses a hub and housing construction similar to that of Figs. 3 and 6 wherein the planet gear hubs 57—58 are journaled upon the pin 36 and are provided with inner enlargements 59—60, terminating in rims 61—62, defining an annular chamber 63 between the parts. In this case, however, this chamber 63 does not necessarily have the radial vanes 64 previously described and the metting faces or edges of the rims 61—62 are preferably closely machined so that the chamber 63 is substantially fluid tight. I then fill this chamber 63 with fluid containing metallic particles, which may be magnetized and which fluid, as well as its use in fluid clutches, has recently become known. The Bureau of Standards has made some findings with reference to this type of fluid which indicate that the particles referred to may be magnetized in order to have a very pronounced effect upon the viscosity of the fluid. I therefore contemplate the use of a permanent magnet, such as indicated at 75, upon one or both of the enlargements 59—60, so as to permanently magnetize the particles in the fluid and this will cause a magnetic clutch effect to brake or retard differential movement of the hubs 57—58 and prevent unwanted freedom of differential action of the axles 12 and 13.

It will be observed that throughout the various exemplifications of my invention there is no definite mechanical lock in the differential such as suggested by others prior hereto, but that there is instead a braking action which will so dampen or retard unwanted differential action that traction may be maintained under all conditions but with the smoothness characteristic of fluid or friction type clutching devices.

Instead of the plug 42 and opening 41 in housing 25 for filling I may provide one of the axles 12—13 with an axial bore 77 and the adjacent oil seal plug 43 with a check valve 78 so that fluid may be forced into the housing from the end of the axle.

It is understood that suitable modifications may be made in the structure as disclosed, providing such modifications come within the spirit and scope of the appended claims. Having now therefore fully illustrated and described my invention, what I claim to be new and desire to protect by Letters Patent is:

1. In a differential of the character described and having a power rotated cage and a pair of opposed differential gears therein, such opposed gears having cooperating tubular and telescoping hub members rotatable with respect to each other, the said hubs having cooperating fluid chambers and longitudinally extending vanes therein for operation as a kinetic fluid clutch to retard relative rotation of the associated gears, and means for supplying fluid in the chambers.

2. In a differential of the character described, a housing, a power rotated differential cage therein and a pair of opposed differential gears in the cage, a pin journaling such gears and this pair of gears having oppositely extending tubular and telescoped hub members, the hubs having cooperating fluid chambers and longitudinal vanes therein acting as a kinetic fluid clutch, fluid in the housing, inlet means at the center of the hub members for supplying fluid to the chambers by centrifugal force as the cage rotates, and outlet means for the fluid.

3. In a differential of the character described, a housing, a power rotated differential cage therein and a pair of opposed differential gears in the cage, a pin journaling such gears and this pair of gears having oppositely extending tubular and telescoped hub members, the hubs having cooperating fluid chambers and longitudinal vanes therein acting as a kinetic fluid clutch, fluid in the housing, inlet means at the center of the hub members for supplying fluid to the chambers by centrifugal force as the cage rotates, and the pin having an axial bore communicating with the chambers for discharging fluid therefrom.

4. In a differential of the character described, a power rotated fluid containing housing having driven shafts extending in opposite directions on the axis of rotation, sun gears in the housing connected to drive said shafts, planet gears journaled in the housing and meshing with the sun gears, and telescoping tubular members connected to rotate with an opposed pair of said gears and having vanes reacting as a kinetic fluid clutch to damp relative differential movements of the shafts.

5. In a differential of the character described, a power rotated fluid containing housing having driven shafts extending in opposite directions on the axis of rotation, sun gears in the housing connected to drive said shafts, planet gears journaled in the housing and meshing with the sun gears, telescoping tubular members connected to rotate with the respective planet gears, and said members having vanes on their adjacent surfaces for reacting on fluid in the housing to damp differential rotation of said shafts.

6. In a differential having a fluid containing housing and a pair of gears opposing each other and rotatable on a common axis in said housing; the improvement which comprises vanes connected to the opposing gears of said pair and disposed radially with respect to said axis, and the vanes of each gear also extending inwardly toward the opposed gear in directions substantially parallel with said axis but terminating short of the opposed gears whereby the vanes will mutually react on fluid within the housing and restrict differential action of the gears.

7. In a differential having a fluid containing housing and sets of side and differential gears; the improvement which comprises vanes directly connected to the individual gears of one of said sets and extending from one gear of one of said sets of gears toward the other gear of said one set but terminating short of the said other gear at their extremities, and said vanes being located radially with respect to the axis of rotation of the gear set to which the vanes are connected whereby to react on fluid in the housing and dampen differential action of all the said gears.

8. In a differential having a fluid containing housing and a pair of spaced apart coaxial gears rotatable in the housing, vanes relatively immovable with respect to said gears and extending therefrom inwardly toward each other but terminating short of the opposed gears, the said vanes being disposed substantially radially with respect to the axis of rotation of the gears to react with fluid in the housing and thereby restrict relative rotation of the gears, and another pair of gears rotatable in the housing and meshing with the first-mentioned pair of gears.

9. In a differential having a fluid containing housing and a pair of gears opposing each other and rotatable on a common axis in said housing; the improvement which comprises vanes connected to the opposing gears of said pair and disposed radially with respect to said axis, the vanes of each gear also extending inwardly toward the opposed gear in directions substantially parallel with said axis but terminating short of the opposed gears, the said pair of opposing gears having hubs meeting end to end and having chambers in their ends, and the said vanes being located in said chambers of said hubs to cooperate as a fluid clutch and retard relative rotation of the gears.

10. In a differential having a fluid containing housing and a pair of gears opposing each other and rotatable on a common axis in said housing; the improvement which comprises vanes connected to the opposing gears of said pair and disposed radially with respect to said axis, the vanes of each gear also extending inwardly toward the opposed gear in directions substantially parallel with said axis but terminating short of the opposed gears, the said pair of opposed gears having hubs meeting end to end and having chambers in their ends, the said vanes being located in said chambers to cooperate as a fluid clutch for retarding relative rotation of the gears, and fluid inlet and outlet means for circulating fluid from the housing through the said vaned chambers.

11. In a differential having a fluid containing housing and a pair of gears opposing each other and rotatable on a common axis in said housing; the improvement which comprises vanes connected to the opposing gears of said pair and disposed radially with respect to said axis, the vanes of each gear also extending from the gears inwardly toward the opposed gear in directions substantially parallel with said axis but terminating short of the opposed gears, the said pair of opposed gears having hubs meeting end to end and having chambers in their ends, the said vanes being located in said chambers to cooperate as a fluid clutch for retarding relative rotation of the gears, and fluid inlet and outlet means for circulating fluid from the housing through the said vaned chambers, the said chambered ends of the hubs being diametrically enlarged relative to the said hubs.

12. In a differential having a fluid containing housing and a pair of gears opposing each other and rotatable on a common axis in said housing; the improvement which comprises vanes connected to the opposing gears of said pair and disposed radially with respect to said axis, and the vanes of each gear also extending from the gears inwardly toward the opposed gear in directions substantially parallel with said axis but terminating short of the opposed gears whereby the vanes will mutually react as paddles on fluid within the housing and restrict differential action of the gears.

13. In a differential having a fluid containing housing and a pair of gears opposing each other and rotatable on a common axis in said housing; the improvement which comprises vanes connected to the opposing gears of said pair and disposed radially with respect to said axis, the vanes of each gear also extending from the gears inwardly toward the opposed gear in directions substantially parallel with said axis but terminating short of the opposed gears whereby the vanes will mutually react as paddles on fluid within the housing and restrict differential action of the gears, the said vanes being also spaced radially outward at their inner edges from the said common axis of rotation of the opposing gears.

References Cited in the file of this patent

UNITED STATES PATENTS

| | | |
|---|---|---|
| 1,251,466 | Bilgram | Jan. 1, 1918 |
| 1,529,942 | Bradley | Mar. 17, 1925 |
| 1,568,639 | Swart | Jan. 5, 1926 |
| 1,659,833 | Norrlin | Feb. 21, 1928 |
| 1,916,715 | Corey | July 4, 1933 |
| 1,933,143 | Janssen | Oct. 31, 1933 |
| 2,229,228 | Sutter | Jan. 21, 1941 |
| 2,267,362 | Ash | Dec. 23, 1941 |
| 2,334,221 | Schmidt | Nov. 16, 1943 |
| 2,375,938 | Moon | May 15, 1945 |
| 2,400,728 | Akers | May 21, 1946 |
| 2,463,091 | Dortout | Mar. 1, 1949 |
| 2,489,859 | Butterworth | Nov. 29, 1949 |
| 2,546,173 | Snyder | Mar. 27, 1951 |

FOREIGN PATENTS

| | | |
|---|---|---|
| 418,582 | Great Britain | Apr. 4, 1934 |

OTHER REFERENCES

Publication: A. I. E. E. Journal, December 1948, Paper #48—238 (Jacob Rabinow).